United States Patent
Onaka (10) Patent No.: US 10,966,028 B2
(45) Date of Patent: Mar. 30, 2021

(54) MOBILE TERMINAL AND COMPUTER-READABLE STORAGE MEDIUM

(71) Applicant: HONDA MOTOR CO., LTD., Tokyo (JP)

(72) Inventor: Junichiro Onaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/667,868

(22) Filed: Oct. 29, 2019

(65) Prior Publication Data
US 2020/0145758 A1 May 7, 2020

(30) Foreign Application Priority Data
Nov. 1, 2018 (JP) .............................. JP2018-206912

(51) Int. Cl.
*H04R 5/04* (2006.01)
*H04L 29/06* (2006.01)
*H04R 5/033* (2006.01)

(52) U.S. Cl.
CPC ............. *H04R 5/04* (2013.01); *H04L 65/601* (2013.01); *H04R 5/033* (2013.01); *H04R 2499/13* (2013.01)

(58) Field of Classification Search
CPC .......................... H04R 2420/03; G06F 3/165
USPC ...................................................... 381/85, 300
See application file for complete search history.

(56) References Cited

U.S. PATENT DOCUMENTS

| | | | |
|---|---|---|---|
| 2015/0063587 A1* | 3/2015 | Park ..................... | H04R 1/1016 381/74 |
| 2015/0200715 A1* | 7/2015 | Oiwa ................... | H04B 5/0025 455/41.1 |
| 2016/0239069 A1* | 8/2016 | Um ....................... | G06F 1/3228 |

FOREIGN PATENT DOCUMENTS

JP 2010199718 A 9/2010

* cited by examiner

*Primary Examiner* — Alexander Krzystan (57) ABSTRACT

The mobile terminal includes a playback signal generation unit that generates a playback signal for playing back a music and outputs the playback signal to a first sound output unit; an interruption detection unit that detects interruption of an output of the sound from the first sound output unit during the playback of the music; an output detection unit that detects that the sound from a second sound output unit can be output; and a time measurement unit that measures a time period after interruption is detected until it is detected by the output detection unit that the output is possible. The playback signal generation unit outputs a playback signal for playing back the music from a playback position advanced forward from a playback position, in which the interruption has been detected, in correspondence to the time period measured by the time measurement unit.

14 Claims, 11 Drawing Sheets

MOBILE TERMINAL AND COMPUTER-READABLE STORAGE MEDIUM

The contents of the following Japanese patent application are incorporated herein by reference:
NO. 2018-206912 filed in JP on Nov. 1, 2018.

BACKGROUND

1. Technical Field

The present invention relates to a mobile terminal and a computer-readable storage medium.

A mobile terminal and an in-vehicle device are associated to use an application, which has been activated on the mobile terminal-side, on the in-vehicle device-side (refer to Patent Document 1).

[Patent Document 1] Japanese Patent Application Publication No. 2010-199718

SUMMARY

However, a configuration of smoothly associating the mobile terminal and the in-vehicle device, considering a time period in which a user of the mobile terminal gets in and out of an automobile, has not been made.

DESCRIPTION OF EXEMPLARY EMBODIMENTS

Hereinbelow, embodiments of the present invention will be described. The embodiments do not limit the invention defined in the claims. Also, all combinations of features described in the embodiments are not necessarily essential to solving means of the invention.

First Embodiment

Figure 1:
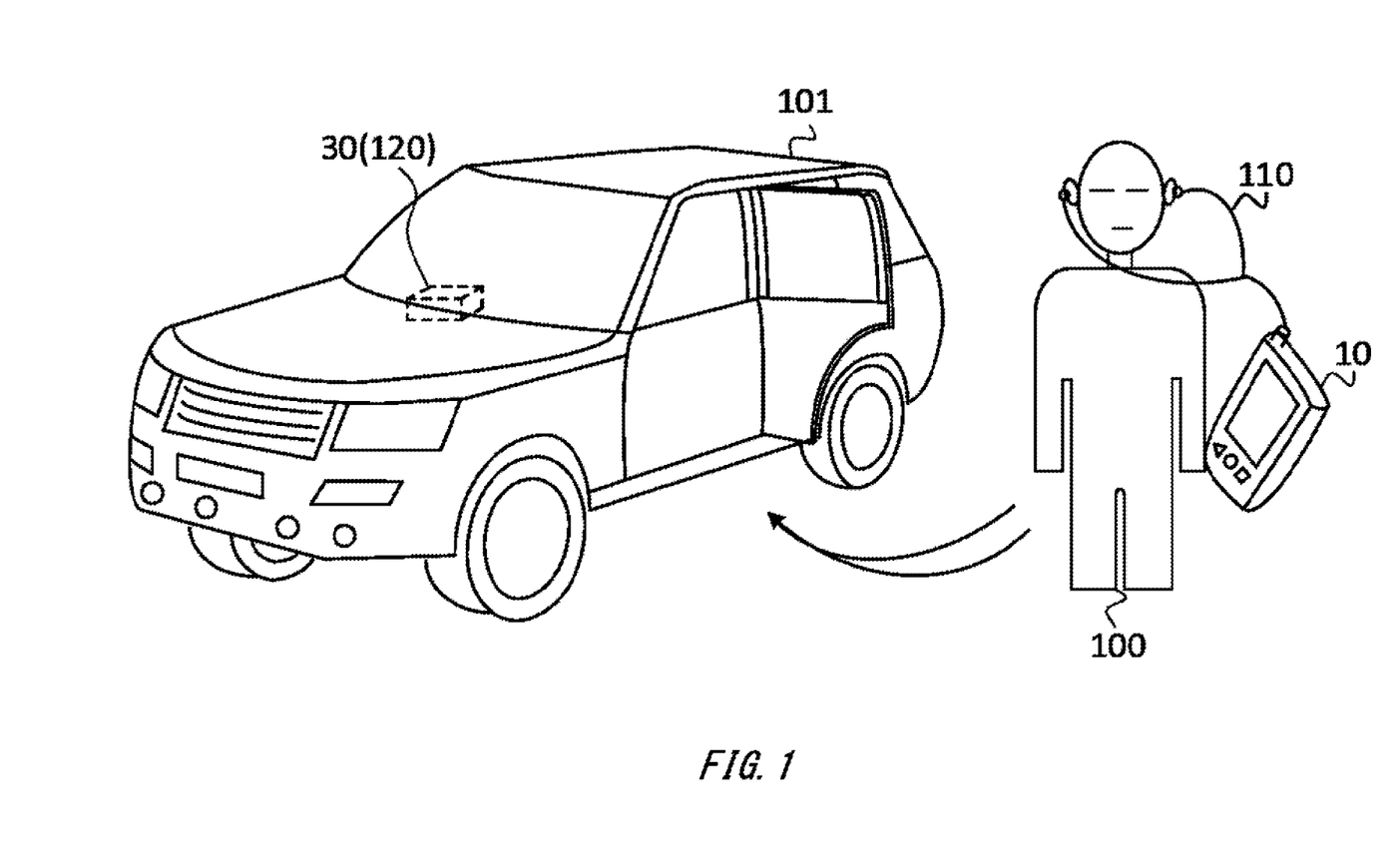
FIG. 1 shows an example of an operating environment of a mobile terminal 10 in a first embodiment.

FIG. 1 shows an example of an operating environment of a mobile terminal 10 in a first embodiment. FIG. 1 depicts a situation in which a user 100 gets in an automobile 101. The user 100 carries a mobile terminal 10, and listens to music with wearing an earphone as an example of a first sound output unit 110 connected to the mobile terminal 10. In the automobile 101, a car audio as an example of an in-vehicle device 30 including a second sound output unit 120 is mounted.

When the user 100 listening to the music by the earphone connected to the mobile terminal 10 gets in the automobile 101, the user may want to continuously listen to the same music even with the car audio. In this case, the user 100 removes the earphone and then operates the car audio of the automobile 101 to play back the music from the car audio.

Herein, due to a phenomenon referred to as 'earworm', the music playing back from the mobile terminal 10 upon the removal of the earphone may continue to linger in a head (brain) of the user 100 even after the earphone is removed. Therefore, when the playback of the music is resumed from the car audio, if the music plays back from a part continuing from a part that continues to linger in the head of the user, the user feels comfortable 100 because the user feels the continuity of the music.

In the first embodiment, the mobile terminal 10 is to automatically associate the playback of the music in the mobile terminal 10 and the playback of the music in the car audio each other in such an aspect that the user can feel the continuity of the music as described above.

Figure 2:
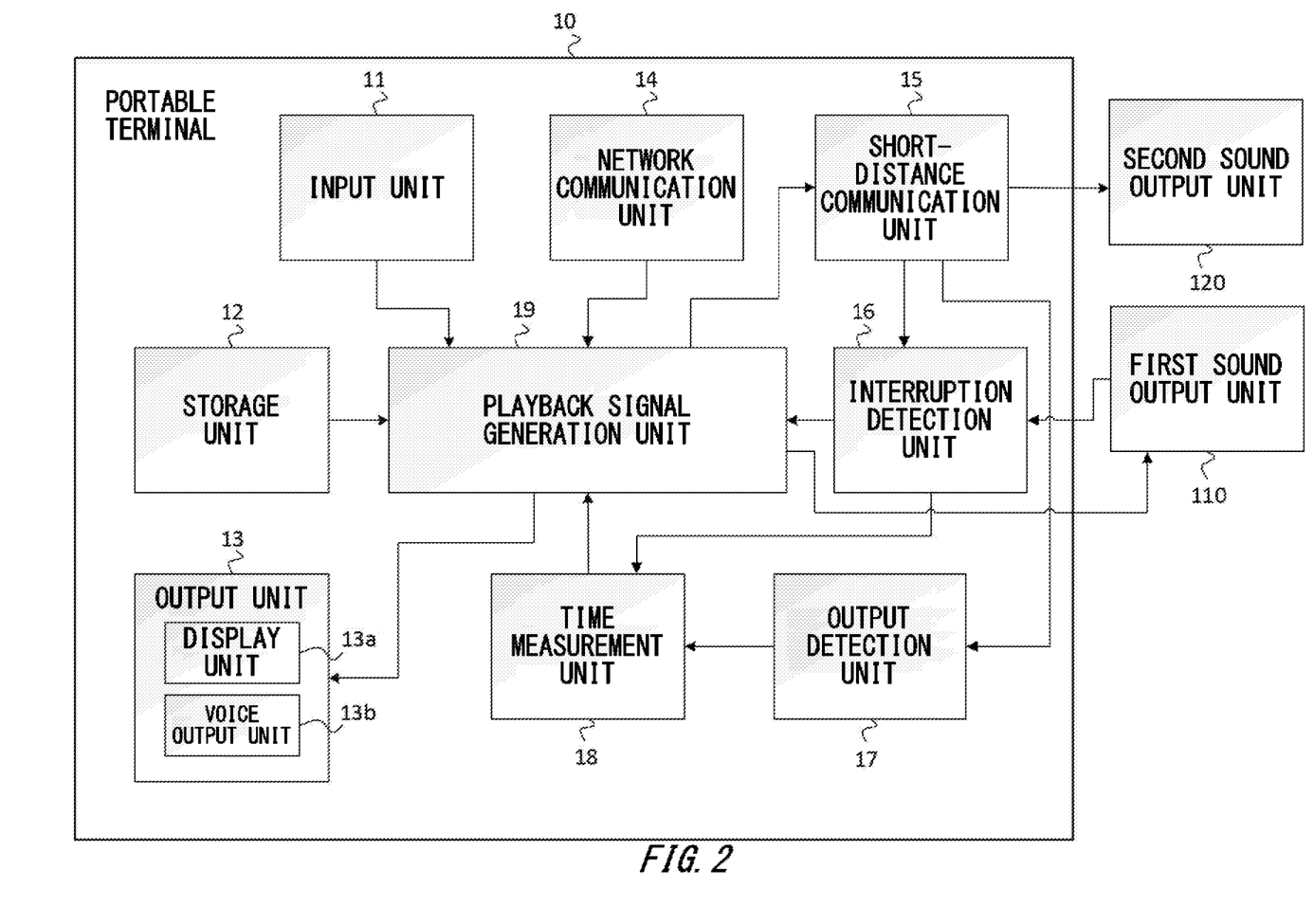
FIG. 2 shows an example of a functional block diagram of the mobile terminal 10 in the first embodiment.

FIG. 2 shows an example of a functional block diagram of the mobile terminal 10 in the first embodiment. In FIG. 2, the mobile terminal 10 is shown together with the first sound output unit 110 and the second sound output unit 120. In the first embodiment, the mobile terminal 10 includes an input unit 11, a storage unit 12, an output unit 13, a network communication unit 14, a short-distance communication unit 15, an interruption detection unit 16, an output detection unit 17, a time measurement unit 18, and a playback signal generation unit 19. The output unit 13 includes a display unit 13a, and a voice output unit 13b. The mobile terminal 10 can connect to the first sound output unit 110 and second sound output unit 120 configured to output a sound.

The mobile terminal 10 is a portable electronic device. For the mobile terminal 10, a multifunctional mobile phone referred to as a smart phone cab be used, for example. The mobile terminal 10 may be another type of a portable information terminal, such as a mobile phone terminal, a tablet PC (Personal Computer), a laptop PC, an electronic book reader, a PDA (Personal Digital Assistant) and the like.

As in the first embodiment, in a situation in which the user 100 gets in the automobile 101, the first sound output unit 110 is an earphone that is to be worn on the user 100, and the second sound output unit 120 is a part of the in-vehicle device 30 that is to be mounted in the automobile 101. The in-vehicle device 30 is, for example, a car audio or a car navigation. In the first embodiment, the in-vehicle device 30 is described as being a car audio. The first sound output unit 110 may be a headphone.

The earphone may be a wired communication type, a wireless communication type or a type corresponding to both the wired communication and the wireless communication.

The input unit 11 may be hard keys, soft keys, a microphone or a touch screen, and may include other input devices. To the input unit 11, a command of the user 100 of the mobile terminal 10 is input. The input command is transmitted to the playback signal generation unit 19.

The output unit 13 includes a display unit 13a, and a voice output unit 13b. The display unit 13a may be a display configured to display an image and a character, and may include other display devices. The voice output unit 13*b* may be a speaker configured to output a music and a sound, and may include other voice output devices. To the output unit 13, data about the music is transmitted from the playback signal generation unit 19.

In the storage unit 12, music data is stored. The music data includes video data and sound data of a music, which are to be played back as the music is played back. The music data may be voice data of an MP3 (MPEG-1 Audio Layer-3) format, voice data of an AAC (Advanced Audio Coding) format and voice data of a Vorbis format, for example. In the storage unit 12, various types of application programs installed in the mobile terminal 10 may be stored. The storage unit 12 is configured to transmit data about the music to the playback signal generation unit 19.

The network communication unit 14 is a predetermined network interface, is communicatively connected to a network via a base station, and is configured to download the music data, application data and the like from a management server apparatus. The network communication unit 14 is configured to transmit the downloaded data to the playback signal generation unit 19.

The short-distance communication unit 15 can use wireless communication technology such as Bluetooth (registered trademark) or wired communication technology such as HDMI (registered trademark) (High-Definition Multimedia Interface), USB (Universal Serial Bus) and the like, for example. The mobile terminal 10 can perform communication with the in-vehicle device 30 via the short-distance communication unit 15. As a profile of Bluetooth communication, A2DP (Advanced Audio Distribution Profile) may be used.

The interruption detection unit 16 is configured to detect that an output of sound from the first sound output unit 110 is interrupted during the playback of the music. In the first embodiment, the interruption detection unit 16 detects that an output of sound from the first sound output unit 110 is interrupted, when the earphone is removed from the user 100.

In this case, the earphone may have an optical sensor, and may be configured to detect the removal of the earphone from the user 100 by optical intensity of an optical signal acquired by the optical sensor. Also, the earphone may have a sound sensor configured to detect acoustic sound, and may be configured to detect the removal of the earphone from the user 100 by signal intensity of the acoustic sound acquired by the sound sensor.

When it is detected that the output of sound from the first sound output unit 110 is interrupted, the interruption detection unit 16 transmits interruption information, which indicates that the output of sound is interrupted, to the time measurement unit 18. The interruption information is also transmitted to the playback signal generation unit 19.

The output detection unit 17 is configured to detect that the sound from the second sound output unit 120 can be output. In the first embodiment, the output detection unit 17 detects that the sound can be output, when connection between the mobile terminal 10 and the car audio is established. In this case, the output detection unit 17 is configured to detect that the sound can be output by receiving the information, which indicates that Bluetooth communication is established between the short-distance communication unit 15 of the mobile terminal 10 and the short-distance communication unit 35 of the in-vehicle device 30, from the short-distance communication unit 15 of the mobile terminal 10.

When it is detected that the sound from the second sound output unit 120 can be output, the output detection unit 17 transmits output-possibility information, which indicates that the sound from the second sound output unit 120 can be output, to the time measurement unit 18.

The time measurement unit 18 is configured to measure an interruption time period, which is a time period after interruption is detected by the interruption detection unit 16 until it is detected by the output detection unit 17 that the output is possible. In the first embodiment, when the time measurement unit 18 receives the interruption information from the interruption detection unit 16, the time measurement unit records the time at which the information is received, as start time of the interruption time period, and starts to measure the interruption time period.

When the time measurement unit 18 receives the output-possibility information from the output detection unit 17, the time measurement unit records the time at which the information is received, as end time of the interruption time period, ends the measurement of the interruption time period, and fixes the interruption time period. The time measurement unit 18 is configured to transmit the fixed interruption time period to the playback signal generation unit 19, together with the output-possibility information.

The playback signal generation unit 19 is configured to generate a playback signal for playing back the music, based on the music data received from the network communication unit 14 or the storage unit 12. A case in which a playback signal for playing back the music is generated based on the music data received from the network communication unit 14 is online playback, and a case in which a playback signal for playing back the music is generated based on the music data received from the storage unit 12 is offline playback. The playback signal generation unit 19 is configured to output the generated playback signal to the earphone as the first sound output unit 110.

When the playback signal generation unit 19 receives the interruption information from the interruption detection unit 16, the playback signal generation unit stops the generation of the playback signal and the output of the playback signal to the earphone, and stores a playback position in which the interruption has been detected by the interruption detection unit 16.

When the playback signal generation unit 19 receives the interruption time period and the output-possibility information from the time measurement unit 18, the playback signal generation unit outputs, to the second sound output unit 120, a playback signal for playing back the music from a playback position advanced forward from the playback position, in which the interruption has been detected by the interruption detection unit 16, in correspondence to the interruption time period measured by the time measurement unit 18.

In the first embodiment, when the playback signal generation unit 19 receives the interruption time period from the time measurement unit 18, the playback signal generation unit determines whether the interruption time period is within a threshold time. The threshold time is, for example, 30 seconds. When the interruption time period is within the threshold time, the playback signal generation unit 19 transmits, to the second sound output unit 120, a playback signal for playing back the music from a playback position advanced forward from the interrupted playback position by the interruption time period. When the interruption time period is not within the threshold time, the playback signal generation unit 19 transmits a playback signal for playing back the music from the interrupted playback position to the second sound output unit 120.

In the first embodiment, even when the playback signal generation unit 19 receives the output-possibility information before receiving the interruption information, the playback signal generation unit continues the output of the music from the first sound output unit 110 until the interruption information is received, without stopping the output of the music from the first sound output unit 110.

Figure 3:
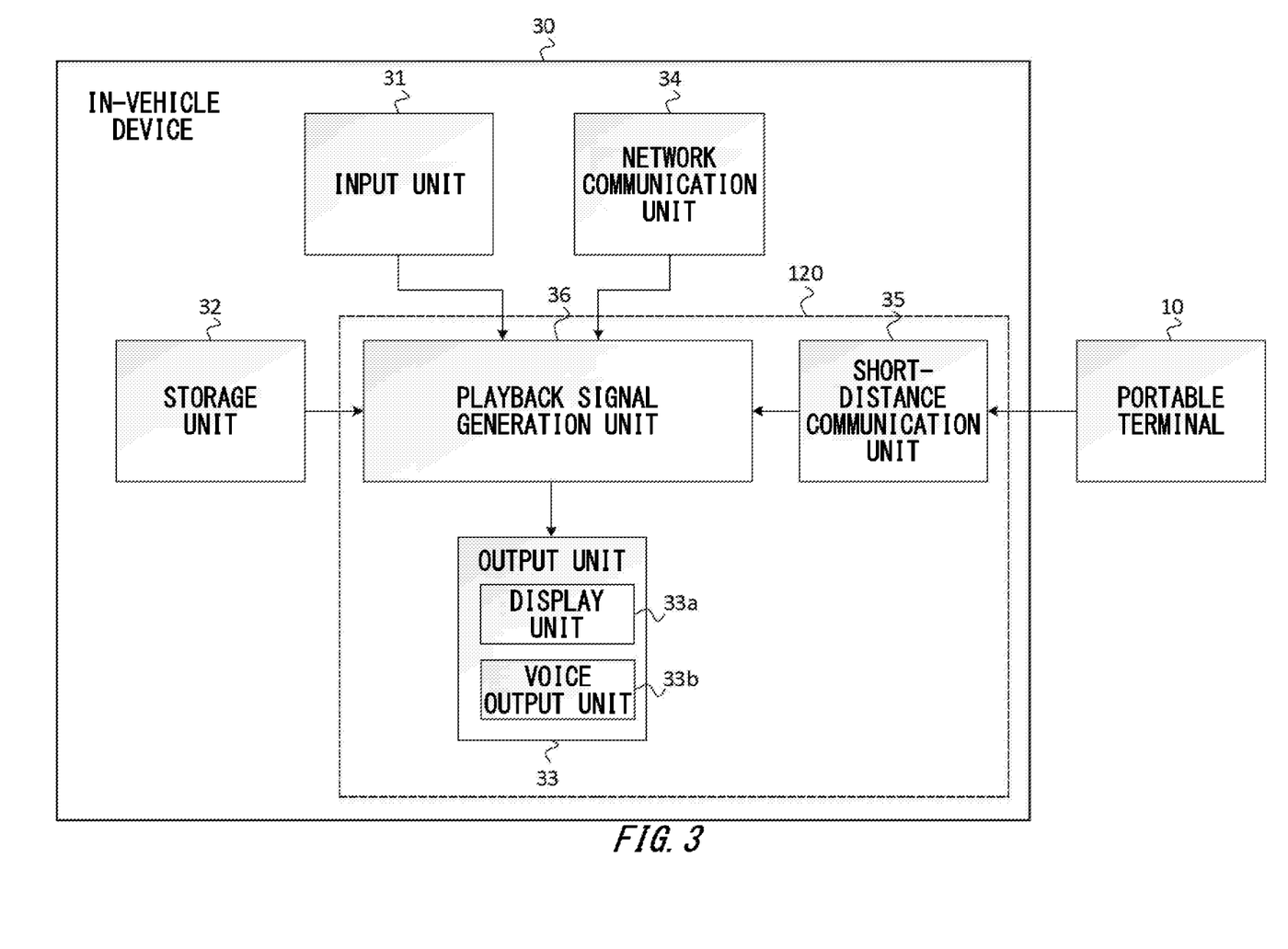
FIG. 3 shows an example of a functional block diagram of an in-vehicle device 30 in the first embodiment.

FIG. 3 shows an example of a functional block diagram of the in-vehicle device 30 in the first embodiment. In FIG. 3, the in-vehicle device 30 is shown together with the mobile terminal 10. In the first embodiment, the in-vehicle device 30 includes an input unit 31, a storage unit 32, an output unit 33, a network communication unit 34, a short-distance communication unit 35, and a playback signal generation unit 36. The output unit 33 includes a display unit 33a, and a voice output unit 33b. The in-vehicle device 30 may be a car audio, a car navigation or another voice output device.

The input unit 31 may be hard keys, soft keys, a microphone or a touch screen, and may include other input devices. To the input unit 31, a command of the user 100 who gets in the automobile 101 is input. The input command is transmitted to the playback signal generation unit 36.

The output unit 33 includes a display unit 33a, and a voice output unit 33b. The display unit 33a may be a display configured to display an image and a character, and may include other display devices. The voice output unit 33b may be a speaker configured to output a music and a sound, and may include other voice output devices. To the output unit 33, information about the music is transmitted from the playback signal generation unit 36.

In the storage unit 32, music data is stored. The music data includes video data and sound data of a music, which are to be played back as the music is played back. In the storage unit 32, various types of application programs installed in the in-vehicle device 30 may be stored. In a case in which the in-vehicle device 30 is a car navigation, map information may be stored in the storage unit 32. The storage unit 32 is configured to transmit the music data to the playback signal generation unit 36.

The network communication unit 34 is a predetermined network interface, is communicatively connected to a network via a base station, and is configured to download the music data, application data and the like from a management server apparatus. The network communication unit 34 is configured to transmit the downloaded data to the playback signal generation unit 36.

The short-distance communication unit 35 can use wireless communication technology such as Bluetooth (registered trademark) or wired communication technology such as HDMI (registered trademark) (High-Definition Multimedia Interface), USB (Universal Serial Bus) and the like, for example. The in-vehicle device 30 can perform communication with the mobile terminal 10 via the short-distance communication unit 35. To the short-distance communication unit 35, the music data is transmitted from the mobile terminal 10.

The playback signal generation unit 36 is configured to generate a playback signal for playing back the music, based on the music data received from the mobile terminal 10 via the short-distance communication unit 35. The playback signal generation unit 36 is configured to output the generated playback signal to the output unit 33. Thereby, it is possible to play back the music in the in-vehicle device 30, based on the music data transmitted from the mobile terminal 10.

In the first embodiment, a combination of the output unit 33, the short-distance communication unit 35 and the playback signal generation unit 36 is described as the second sound output unit 120.

In the meantime, the mobile terminal 10 and the in-vehicle device 30 may be implemented by activating software or program, in which operations of the respective units of the mobile terminal 10 and the in-vehicle device 30 are described, in an information processing device having a general configuration.

The information processing device to be used as the mobile terminal 10 and the in-vehicle device 3 may include a data processing device having a processor such as a CPU (Central Processing Unit), a ROM (Read Only Memory), a RAM (Random Access Memory), a communication interface and the like, an input device such as a touch panel, a microphone, a GPS (Global Positioning System) information acquisition device, an acceleration sensor, a gyro sensor, and the like, an output device such as a display device, a speaker, a vibration device and the like, and a storage device such as a memory, an HDD (Hard Disk Drive) and the like.

The data processing device or storage device may store therein the software or program. The software or program is executed by the processor, thereby causing the information processing device to execute the operations described in the software or program.

Figure 4:
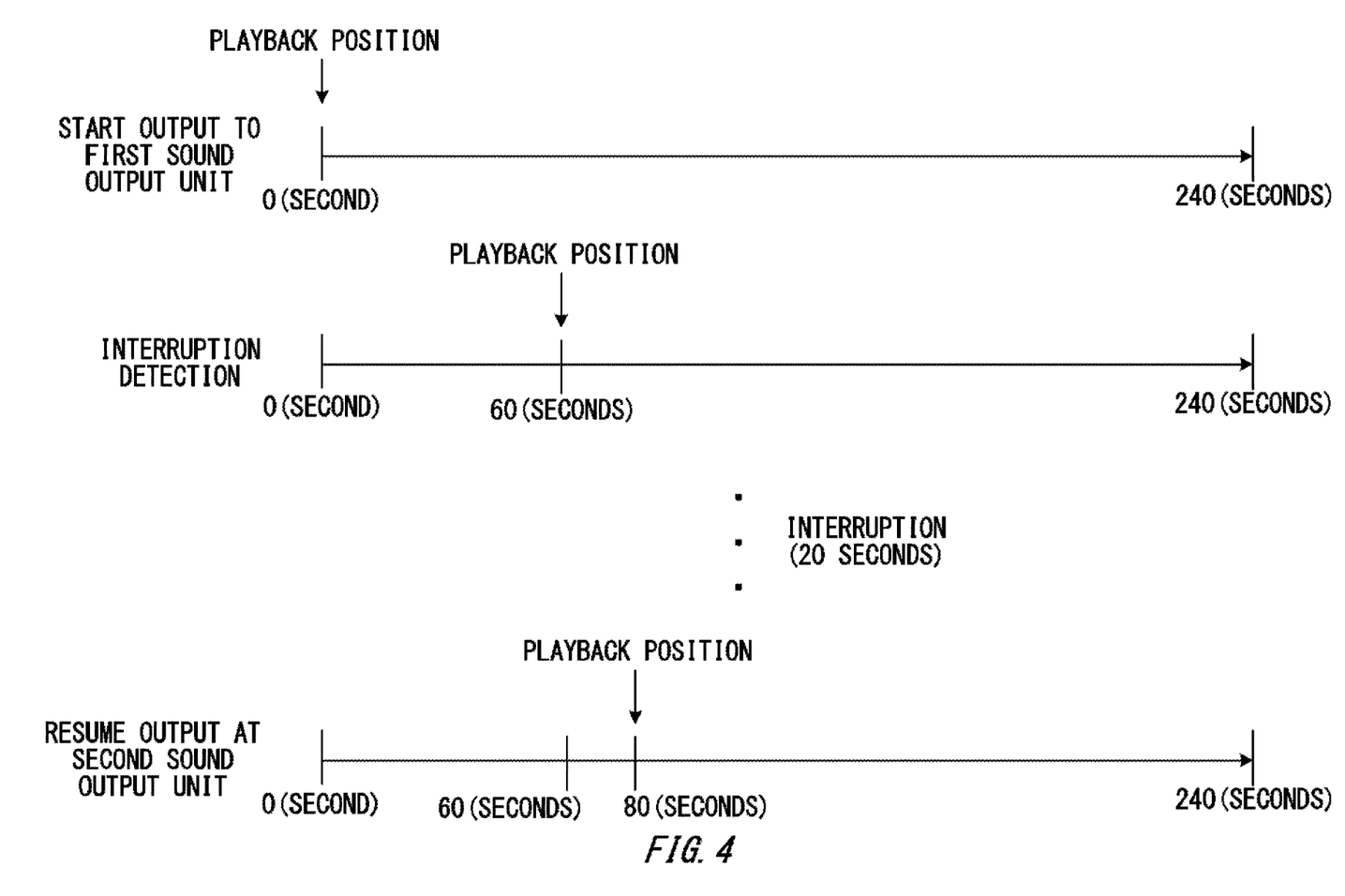
FIG. 4 shows an example of a playback timeline of a music in the first embodiment.

FIG. 4 shows an example of a playback timeline of a music in the first embodiment. In FIG. 4, an example of an aspect in which a current playback position of music stepwise changes is shown. As an example, it is assumed that the music has a length of 240 seconds. On an upper part of FIG. 4, a step in which the output of the music has started by the earphone as the first sound output unit 110 is shown. As shown in the upper part of FIG. 4, in the step in which the output of the music has started by the earphone, the playback position of the music is located in a position of 0 (zero) second, which is the beginning of the music.

On an intermediate part of FIG. 4, a step in which the interruption of the output of the music has been detected by the interruption detection unit 16 is shown. As shown in the intermediate part of FIG. 4, the playback of the music is progressing, and the current playback position of the music is located in a position of 60 seconds. At this point in time, since the interruption has been detected, the playback signal generation unit 19 pauses the generation and transmission of the playback signal. As shown in FIG. 4, it is assumed that the interruption time period is 20 seconds and is equal to or less than the threshold time (for example, 30 seconds).

On a lower part of FIG. 4, a step in which the output of the music from the car audio as the second sound output unit 120 is resumed is shown. As shown in the lower part of FIG. 4, in the case in which the interruption time period is 20 seconds and is equal to or less than the threshold time, when the output of the music is resumed in the car audio, the playback position of the music is advanced by 20 seconds, which is the interruption time period, by the playback signal generation unit 19, so that the current playback position is located in a position of 80 seconds. The playback signal generation unit 19 resumes the generation and transmission of the playback signal of the music from the playback position of 80 seconds.

Figure 5:
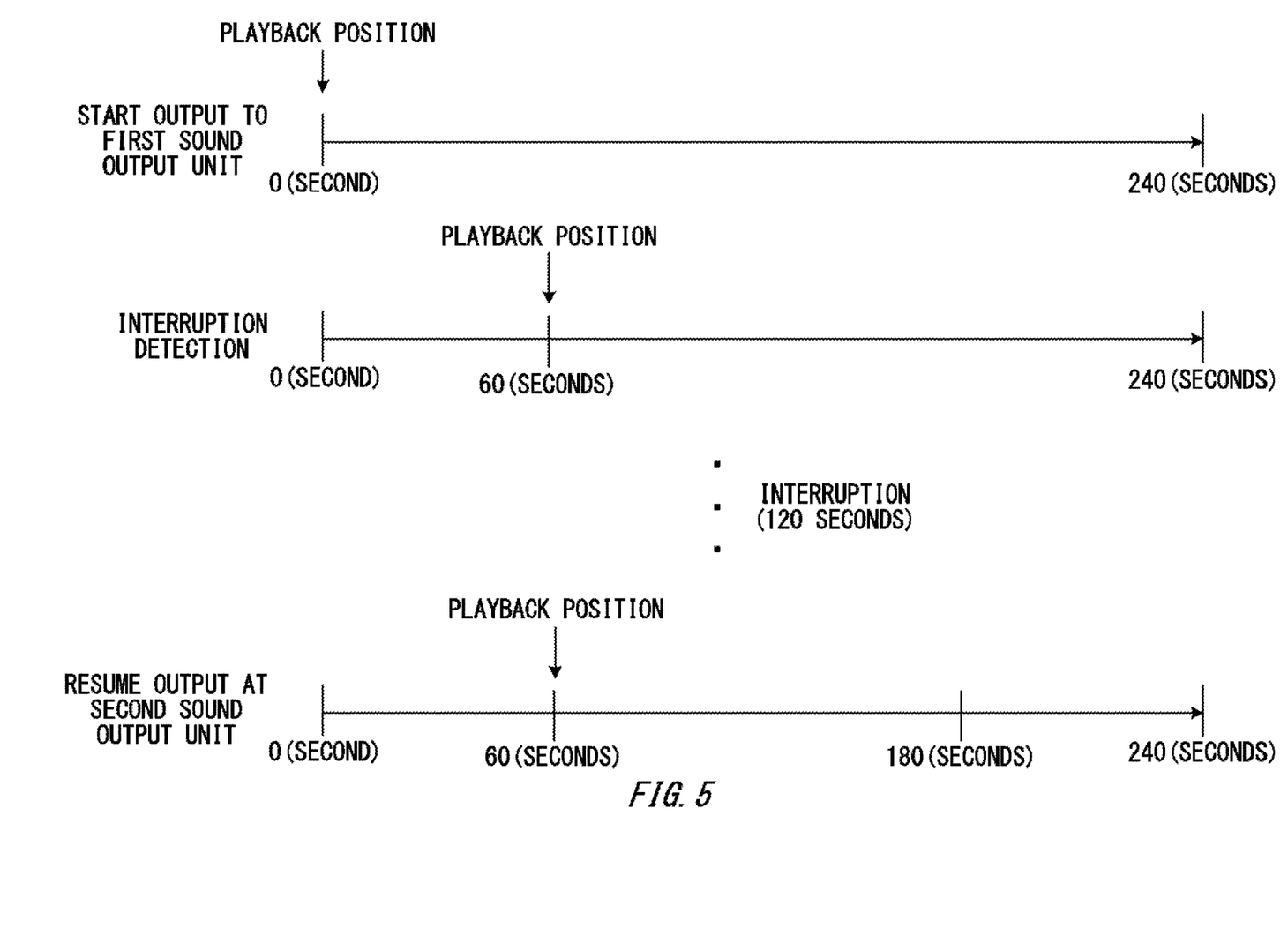
FIG. 5 shows another example of the playback timeline of the music in the first embodiment.

FIG. 5 shows another example of the playback timeline of the music in the first embodiment. In FIG. 5, an example of an aspect in which a current playback position of music stepwise changes is shown. Unlike FIG. 4, in FIG. 5, the interruption time period is 120 seconds. On an upper part of FIG. 5, a step in which the output of the music has started by the earphone as the first sound output unit 110 is shown. As shown in the upper part of FIG. 5, in the step in which the output of the music has started by the earphone, the playback position of the music is located in a position of 0 (zero) second, which is the beginning of the music.

On an intermediate part of FIG. 5, a step in which the interruption of the output of the music has been detected by the interruption detection unit 16 is shown. As shown in the intermediate part of FIG. 5, the playback of the music is progressing, and the current playback position of the music is located in a position of 60 seconds. Herein, since the interruption has been detected, the playback signal generation unit 19 pauses the generation and transmission of the playback signal. As shown in FIG. 5, it is assumed that the interruption time period is 120 seconds and is longer than the threshold time (for example, 30 seconds).

On a lower part of FIG. 5, a step in which the output of the music from the car audio as the second sound output unit 120 has been resumed is shown. As shown in FIG. 5, in the case in which the interruption time period is 120 seconds and longer than the threshold time, if the playback of the music is resumed from a playback position of 180 seconds advanced by 120 seconds, which is the interruption time period, the user 100 may instead feel uncomfortable. Therefore, in the first embodiment, when the output of the music is resumed from the car audio, the playback position of the music is not advanced by the interruption time period by the playback signal generation unit 19, so that the playback position is located in the position of 60 seconds. The playback signal generation unit 19 resumes the generation and transmission of the playback signal of the music from the playback position of 60 seconds.

Figure 6:
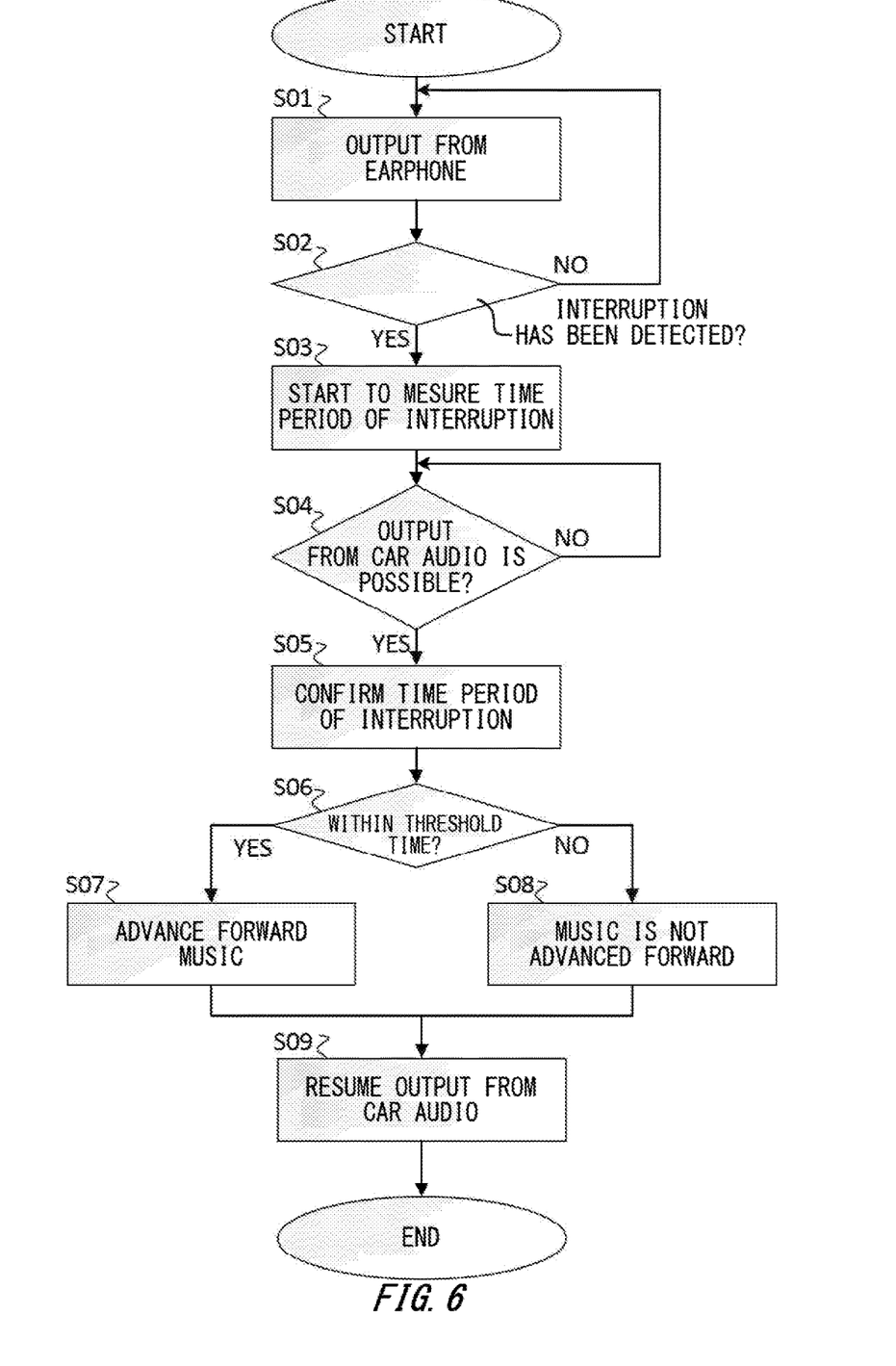
FIG. 6 is a flowchart showing processing that is to be executed in the mobile terminal 10 in the first embodiment.

FIG. 6 is a flowchart showing processing that is to be executed in the mobile terminal 10 in the first embodiment. FIG. 6 shows processing that is to be executed in the mobile terminal 10 when the user 100 gets in the automobile 101.

The music is output from the earphone as the first sound output unit 110 (S01). When the interruption detection unit 16 detects that the earphone has been removed from the user (S02: Yes), the interruption detection unit 16 transmits the interruption information, which indicates that the output of the music from the earphone has been interrupted, to the time measurement unit 18, and the time measurement unit 18 starts to measure the interruption time period (S03). The interruption information is also transmitted to the playback signal generation unit 19.

When the connection between the short-distance communication unit 15 of the mobile terminal 10 and the short-distance communication unit 35 of the second sound output unit 120 of the car audio is established and the output detection unit 17 detects that the music can be output from the car audio (S04: Yes), the output detection unit 17 transmits the output-possibility information, which indicates that the music can be output from the second sound output unit 120, to the time measurement unit 18 and the time measurement unit 18 fixes the interruption time period (S05). The interruption time period is transmitted from the time measurement unit 18 to the playback signal generation unit 19.

The playback signal generation unit 19 determines whether the interruption time period is within the threshold time (S06). When it is determined that the interruption time period is within the threshold time (S06: Yes), the playback signal generation unit 19 transmits the playback signal for playing back the music from a playback position advanced forward from a playback position, in which the music has been interrupted, by the interruption time period to the car audio as the second sound output unit 120 via the short-distance communication unit 15 (S07), as shown in FIG. 4.

When it is determined that the interruption time period is not within the threshold time (S06: No), the playback signal generation unit 19 transmits the playback signal for playing back the music from the playback position, in which the music has been interrupted, to the car audio via the short-distance communication unit 15 (S08), as shown in FIG. 5. When it is determined that the interruption time period is not within the threshold time (S06: No), the playback signal generation unit 19 may transmit a playback signal for playing back the music from a position of the beginning of the music to the car audio, instead of the above processing.

The car audio resumes the playback of the music, based on the playback signal including the playback position received from the playback signal generation unit 19 (S09).

Figure 7:
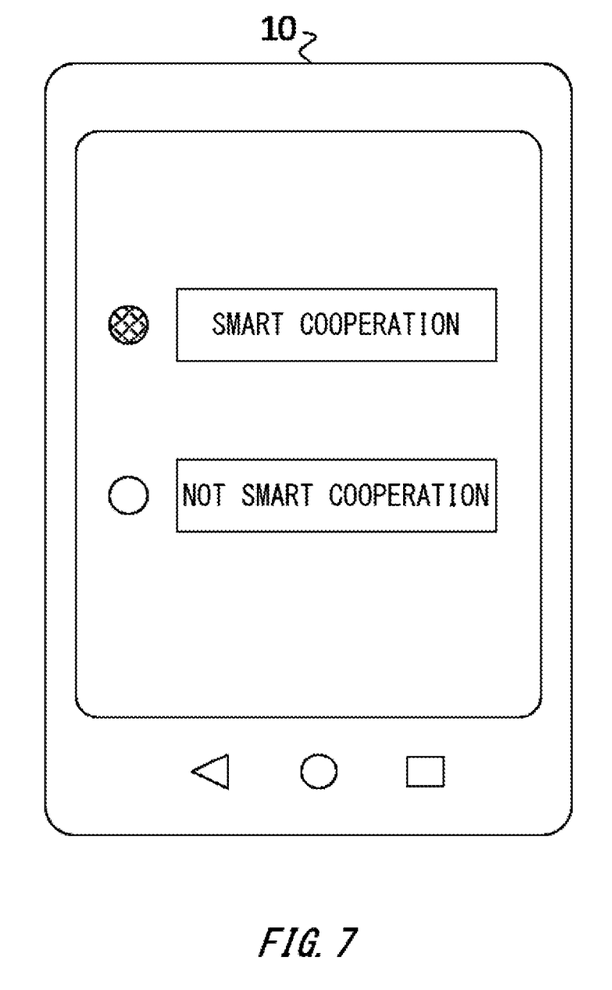
FIG. 7 shows an example of a setting screen of the mobile terminal 10 in the first embodiment.

FIG. 7 shows an example of a setting screen of the mobile terminal 10 in the first embodiment. When associating the playback of the music in the mobile terminal 10 and the playback of the music in the car audio each other, the user makes a setting for association of the playback by the mobile terminal 10. In FIG. 7, when the user selects "Smart Association", it is possible to make a setting of associating the playback of the music in the mobile terminal 10 and the playback of the music in the car audio each other.

Specifically, in the case in which the user 100 gets in the automobile 101, the connection between the devices is established as the user gets in the automobile 101, so that the music that the user 100 listens to from the earphone connected to the mobile terminal 10 is automatically output from the car audio. As a result, it is possible to continue to listen to the same music also in the car audio.

In FIG. 7, when the user selects "No Smart Association", the playback of the music in the mobile terminal 10 and the playback of the music in the car audio are not associated, and the music is not automatically output from the car audio even if the user 100 gets in the automobile 101. In this case, a setting at the time of the previous power-off is prioritized. Therefore, for example, in a case in which FM radio is played from the car audio at the time of the previous power-off, the FM radio is also played this time.

Figure 8:
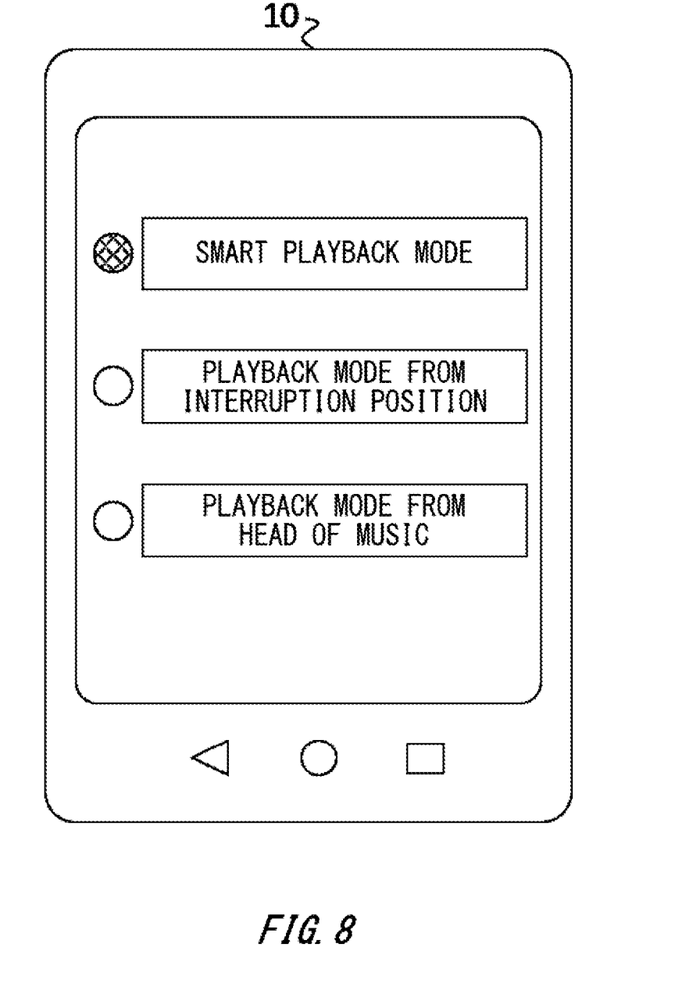
FIG. 8 shows an example of the setting screen of the mobile terminal 10 in the first embodiment.

FIG. 8 shows an example of a subsequent setting screen of the mobile terminal 10 shown in FIG. 7. In FIG. 7, when the user selects "Smart Association", the setting screen of FIG. 8 is displayed as a subsequent setting screen. In FIG. 8, in a case in which the user selects "Smart Playback Mode", when the interruption time period is within the threshold time, a setting of resuming playback of a music from a playback position advanced by the interruption time period is made.

In FIG. 8, in a case in which the user selects "Playback Mode From Interruption Position", even when the interruption time period occurs as the user 100 gets in the automobile 101, for example, a setting of playing back the music from an interrupted playback position without advancing the playback position by the interruption time period is made.

In FIG. 8, in a case in which the user selects "Playback Mode From Beginning of Music", when the interruption time period occurs as the user 100 gets in the automobile 101, for example, the playback is resumed from the beginning of the music.

According to the mobile terminal 10 of the first embodiment, in the situation in which the user 100 gets in the automobile 101, the playback of the music in the mobile terminal 10 and the playback of the music in the car audio can be associated with each other. Thereby, the user 100 can continue to listen to the music in a comfortable state in which the user feels the continuity of the music.

Modified Embodiment 1

In the first embodiment, the interruption detection unit 16 detects that the output of the sound from the first sound output unit 110 has been interrupted, when the earphone is removed from the user 100. However, the interruption detection unit 16 may detect that the output of the sound from the first sound output unit 110 is interrupted, when the connection between the mobile terminal 10 and the earphone is disconnected.

In this case, the mobile terminal 10 may have a circuit for plug detection of the earphone, and may detect the disconnection from the earphone by a difference of electric resistances when a plug of the earphone is inserted into the mobile terminal 10 and when the plug is removed.

Modified Embodiment 2

In the first embodiment, the output detection unit 17 detects that the sound can be output, when the connection with the car audio is established. However, the output detection unit 17 may detect that the sound can be output, when an operation of opening and closing a door of the automobile 101 is performed.

In this case, the opening and closing operation of the door may be at least one of an operation of opening the door and an operation of closing the door. In this case, a sensor configured to sense the opening and closing operation of the door of the automobile 101 may be attached to the door of the automobile 101, and it may be detected that the sound can be output, when the short-distance communication unit 15 of the mobile terminal 10 receives information, which indicates that the door is opened or closed, from the sensor.

Modified Embodiment 3

In the first embodiment, when it is determined that the interruption time period is not within the threshold time, the playback signal generation unit 19 transmits the playback signal for playing back the music from the interrupted playback position to the second sound output unit 120. However, when it is determined that the interruption time period is not within the threshold time, the playback signal generation unit 19 may transmit a playback signal for playing back the music from a position of the beginning of the music to the second sound output unit 120.

Modified Embodiment 4

In the first embodiment, even when the playback signal generation unit 19 receives the output-possibility information before receiving the interruption information, the playback signal generation unit continues the output from the earphone until the interruption information is received, without stopping the output of the music from the earphone. However, when the playback signal generation unit 19 receives the output-possibility information before receiving the interruption information, the playback signal generation unit may stop the output from the earphone, and start the output of the music from the car audio.

Modified Embodiment 5

In the first embodiment, as an example, when the interruption time period is equal to or longer than the predetermined time, the music is played back from the interrupted position. Instead, the playback position may be changed, depending on whether the interruption time period is longer than a remaining time of the music after the interruption. In this case, when the interruption time period is longer than the remaining time of the music, the music may be played back from the beginning thereof, and when the interruption time period is shorter than the remaining time of the music, the music may be played back from a position advanced by the interruption time period.

Second Embodiment

Figure 9:
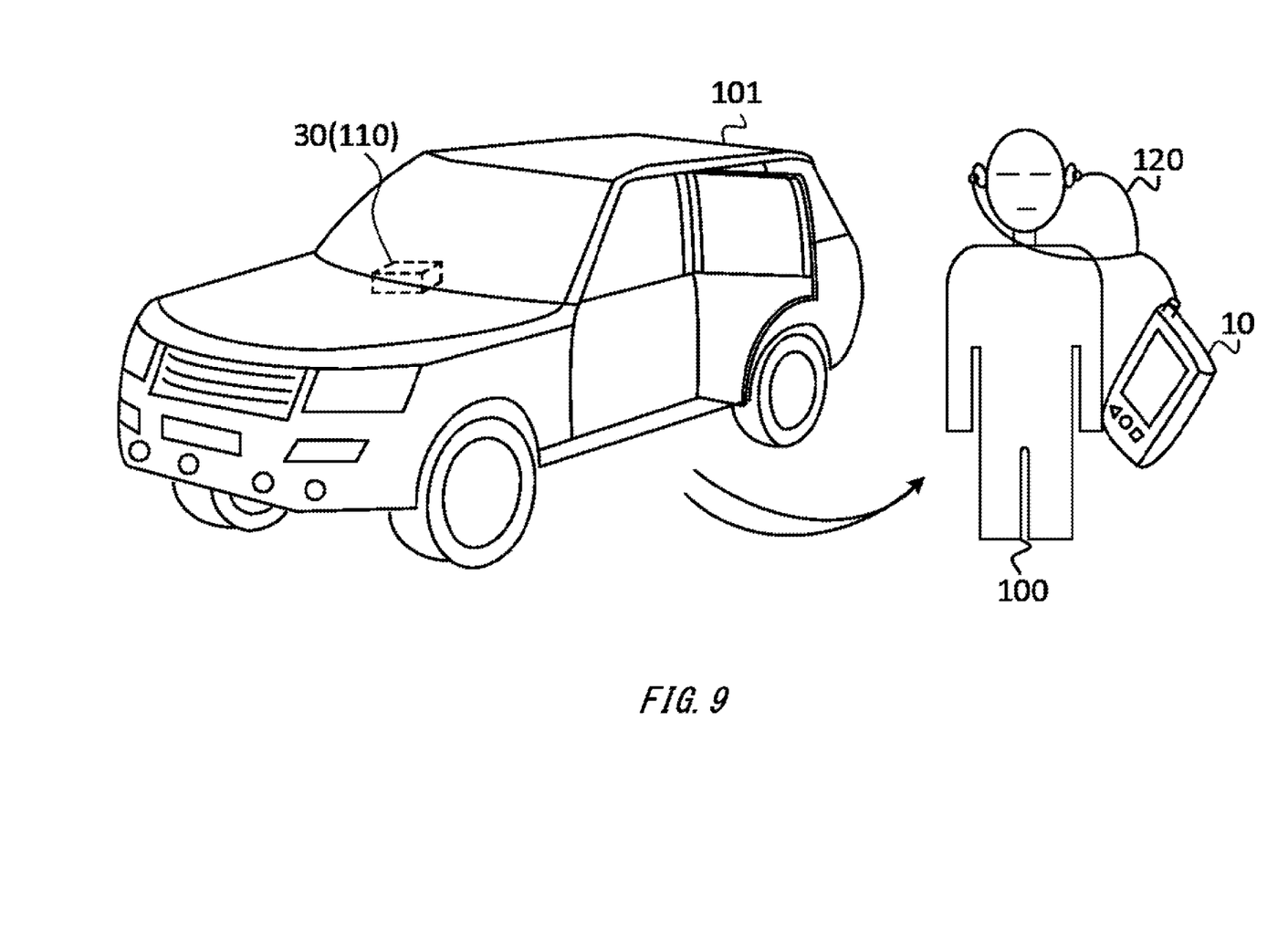
FIG. 9 shows an example of the operating environment of the mobile terminal 10 in a second embodiment.

FIG. 9 shows an example of the operating environment of the mobile terminal 10 in a second embodiment. In FIG. 9, a situation in which the user 100 gets out of the automobile 101 is shown. The first embodiment is to associate the playback of the music in the mobile terminal 10 and the playback of the music in the in-vehicle device 30 each other, in the situation in which the user 100 gets in the automobile 101. In contrast, the second embodiment is to associate the playback of the music in the in-vehicle device 30 and the playback of the music in the mobile terminal 10 each other, in a situation in which the user 100 gets out of the automobile 101.

In a case in which the user 100 who is driving the automobile 101 listens to the music from the car audio as an example of the in-vehicle device 30 of the automobile 101, the user may want to continuously listen to the same music even from the mobile terminal 10 after getting out of the automobile 101. In this case, after the user 100 stops an engine of the automobile 101 and parks the automobile, the user gets out of the automobile 101, wears the earphone and operates the mobile terminal 10 to play back the same music.

Also in this case, in a step before the user 100 wears the earphone after getting out of the automobile 101, the music may continue to linger in the head (brain) of the user 100, based on the memory of the user 100 as to the music. Therefore, when the playback of the music is resumed from the earphone, if the music is resumed from a part continuing from a part that continues to linger in the head of the user 100, the user 100 feels comfortable because the user feels the continuity of the music.

In the second embodiment, the mobile terminal 10 is to automatically associate the playback of the music in the mobile terminal 10 and the playback of the music in the car audio each other in such an aspect that the user can feel the continuity of the music, in the situation in which the user 100 gets out of the automobile 101.

Again referring to FIG. 2, the functions of the mobile terminal 10 of the second embodiment are described. In the below, only the functions, which are different from the mobile terminal 10 of the first embodiment, are described, and the descriptions of the configurations having the same functions as the mobile terminal 10 of the first embodiment are omitted.

As in the second embodiment, in the situation in which the user 100 gets out of the automobile 101, the first sound output unit 110 is a part of the in-vehicle device 30 to be mounted in the automobile 101, and the second sound output unit 120 is a part of the earphone to be worn on the user 100. The in-vehicle device 30 is a car audio or a car navigation. In the second embodiment, the in-vehicle device 30 is described as being a car audio. The second sound output unit 120 may be a headphone.

In the second embodiment, the interruption detection unit 16 detects that the sound has been interrupted, when an operation of opening and closing a door of the automobile 101 is performed. The opening and closing operation of the door may be at least one of an operation of opening the door and an operation of closing the door. In this case, a sensor configured to sense the opening and closing operation of the door of the automobile 101 may be attached to the door of the automobile 101, and it is detected that the sound has been interrupted, when the short-distance communication unit 15 of the mobile terminal 10 receives information, which indicates that the door is opened or closed, from the sensor.

In the second embodiment, the output detection unit 17 detects that the sound can be output, when the earphone is worn on the user 100. In this case, the earphone may have an optical sensor, and may be configured to detect that the earphone is worn on the user 100, by optical intensity of an optical signal acquired by the optical sensor. Also, the earphone may have a sound sensor configured to detect acoustic sound, and may be configured to detect that the earphone is worn on the user 100 by signal intensity of the acoustic sound acquired by the sound sensor.

Figure 10:
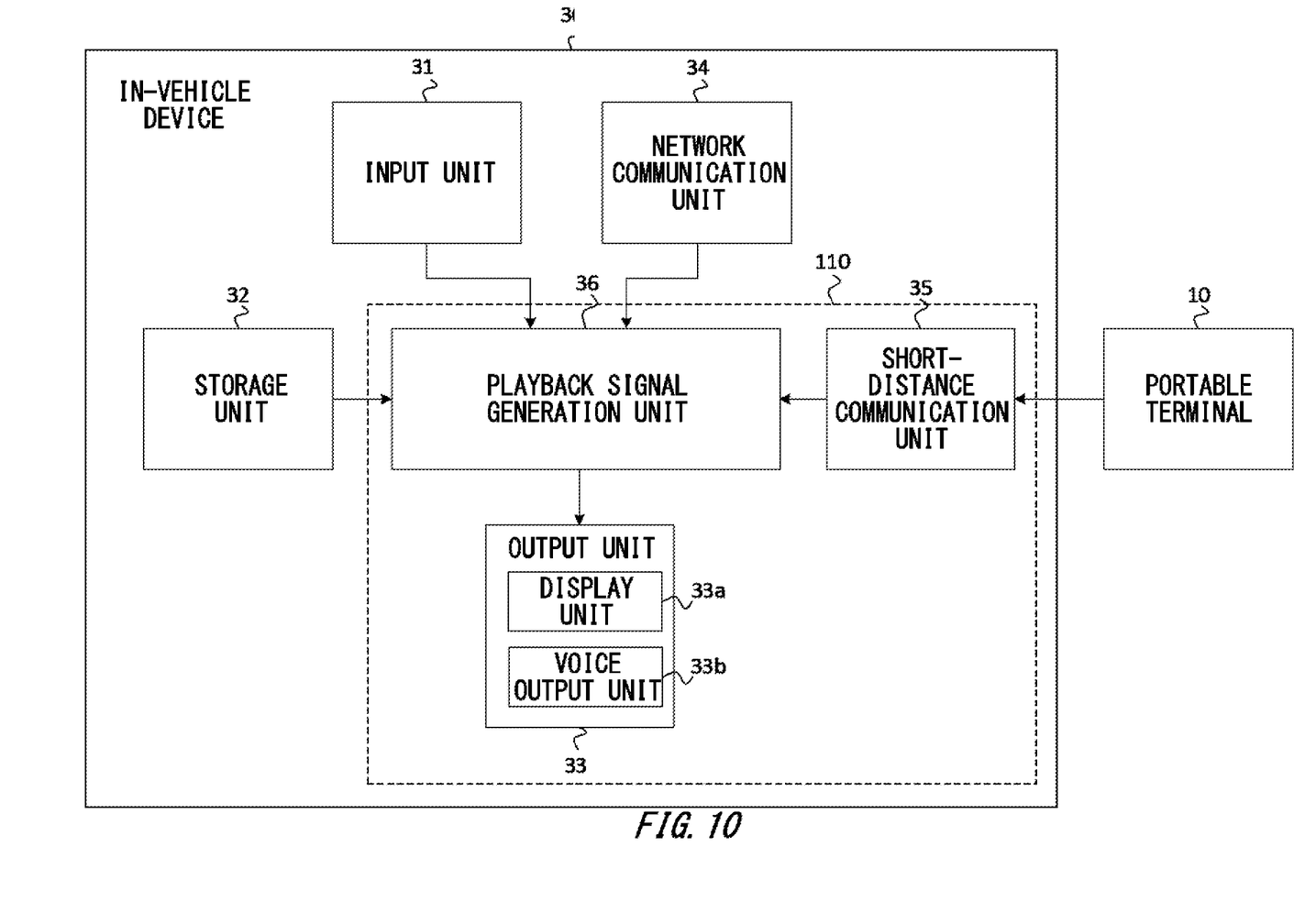
FIG. 10 shows an example of the functional block diagram of the mobile terminal 30 in the second embodiment.

FIG. 10 shows an example of the functional block diagram of the mobile terminal 30 in the second embodiment. The in-vehicle device 30 of the second embodiment is different from the in-vehicle device 30 of the first embodiment, in that the configuration including the playback signal generation unit 36, the short-distance communication unit 35 and the output unit 33 is the first sound output unit 110. As regards the other configurations, the in-vehicle device 30 of the second embodiment is the same as the in-vehicle device 30 of the first embodiment.

Figure 11:
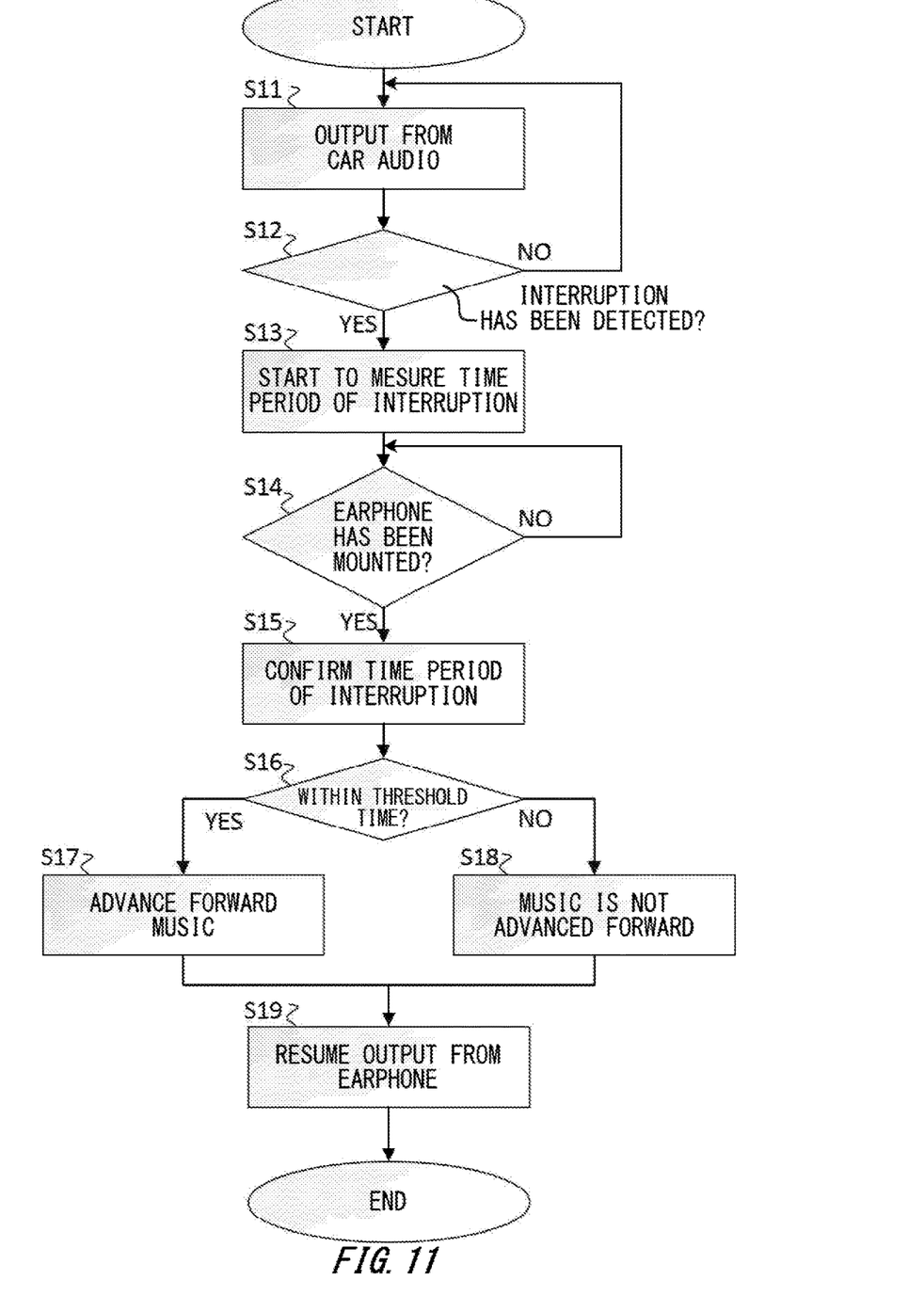
FIG. 11 is a flowchart showing processing that is to be executed in the mobile terminal 10 in the second embodiment.

FIG. 11 is a flowchart showing processing that is to be executed in the mobile terminal 10 in the second embodiment. FIG. 11 shows processing that is to be executed in the mobile terminal 10 when the user 100 gets out of the automobile 101.

The music is output from the car audio as the first sound output unit 110 (S01). When the interruption detection unit 16 detects that the output of the music from the car audio has been interrupted by the opening and closing operation of the door of the automobile 101 (S12: Yes), the interruption detection unit 16 transmits the interruption information, which indicates that the output of the music from the car audio has been interrupted, to the time measurement unit 18, and the time measurement unit 18 starts to measure the interruption time period (S03). The interruption information is also transmitted to the playback signal generation unit 19.

When the output detection unit 17 detects that the music can be output from the earphone as the second sound output unit 120 as the earphone is worn on the user 100 (S14: Yes), the output detection unit 17 transmits the output-possibility information, which indicates that the sound can be output from the earphone, to the time measurement unit 18, and the time measurement unit 18 fixes the interruption time period (S15). The interruption time period is transmitted from the time measurement unit 18 to the playback signal generation unit 19.

The playback signal generation unit 19 determines whether the interruption time period is within the threshold time (S16). When it is determined that the interruption time period is within the threshold time (S16: Yes), the playback signal generation unit 19 transmits the playback signal for playing back the music from a playback position advanced forward from a playback position, in which the music has been interrupted, by the interruption time period to the earphone as the second sound output unit 120 (S17).

When it is determined that the interruption time period is not within the threshold time (S16: No), the playback signal generation unit 19 transmits the playback signal for playing back the music from the position, in which the music has been interrupted, to the earphone as the second sound output unit 120 (S18). When it is determined that the interruption time period is not within the threshold time (S16: No), the playback signal generation unit 19 may transmit a playback signal for playing back the music from a position of the beginning of the music to the earphone, instead of the above processing.

Based on the playback signal including the playback position received from the playback signal generation unit 19, the playback of the music is resumed from the earphone as the second sound output unit 120 (S19).

According to the mobile terminal 10 of the second embodiment, in the situation in which the user 100 gets out of the automobile 101, the playback of the music in the car audio and the playback of the music in the mobile terminal 10 can be associated with each other. Thereby, the user 100 can continue to listen to the music in a comfortable state in which the user feels the continuity of the music.

Modified Embodiment 1

In the second embodiment, the interruption detection unit 16 detects that the sound has been interrupted, when the opening and closing operation of the door of the automobile 101 is performed. However, the interruption detection unit 16 may detect that the sound has been interrupted, when the connection with the car audio is disconnected. In this case, the interruption detection unit 16 may detect that the sound has been interrupted, by receiving the information, which indicates that the connection between the short-distance communication unit 15 of the mobile terminal 10 and the short-distance communication unit 35 of the in-vehicle device 30 is disconnected, from the short-distance communication unit 15 of the mobile terminal 10.

Modified Embodiment 2

In the second embodiment, the output detection unit 17 detects that the sound can be output, when the earphone is worn on the user 100. However, the output detection unit 17 may detect that the sound can be output, when the connection between the mobile terminal 10 and the earphone is established.

In this case, the mobile terminal 10 may have a circuit for plug detection of the earphone, and may detect that the connection with the earphone is established by a difference of electric resistances when a plug of the earphone is inserted into the mobile terminal 10 and when the plug is removed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: mobile terminal, 11: input unit, 12: storage unit, 13: output unit, 13a: display unit, 13b: voice output unit, 14: network communication unit, 15: short-distance communication unit, 16: interruption detection unit, 17: output detection unit, 18: time measurement unit, 19: playback signal generation unit, 30: in-vehicle device, 31: input unit, 32: storage unit, 33: output unit, 33a: display unit, 33b: voice output unit, 34: network communication unit, 35: short-distance communication unit, 36: playback signal generation unit, 100: user, 101: automobile, 110: first sound output unit, and 120: second sound output unit.

What is claimed is:

1. A device comprising:
a playback signal generation unit configured to generate a playback signal for playing back a music and to output the playback signal to a first sound output unit;
an interruption detection unit configured to detect interruption of an output of sound from the first sound output unit during the playback of the music;
an output detection unit configured to detect that sound from a second sound output unit can be output; and
a time measurement unit configured to measure a time period after interruption is detected by the interruption detection unit until it is detected by the output detection unit that the output is possible, wherein
the playback signal generation unit is configured to determine whether the time period is within a threshold value and output, to the second sound output unit, in response to a determination that the time period is within the threshold value, a playback signal for playing back the music from a playback position advanced forward from a playback position, in which the interruption has been detected by the interruption detection unit, in correspondence to the time period measured by the time measurement unit.

2. The device according to claim 1, wherein
the first sound output unit is at least one of a headphone and an earphone to be worn on a user, and the second sound output unit is at least one of a car audio and a car navigation to be mounted on an automobile.

3. The device according to claim 2, wherein
the interruption detection unit detects that the sound has been interrupted, when the at least one of the headphone and the earphone is removed from the user.

4. The device according to claim 2, wherein
the interruption detection unit detects that the sound has been interrupted, when connection to the at least one of the headphone and the earphone is disconnected.

5. The device according to claim 2, wherein
the output detection unit detects that the sound can be output, when connection to the at least one of the car audio and the car navigation is established.

6. A device comprising:
a playback signal generation unit configured to generate a playback signal for playing back a music and to output the playback signal to a first sound output unit;
an interruption detection unit configured to detect interruption of an output of sound from the first sound output unit during the playback of the music;
an output detection unit configured to detect that sound from a second sound output unit can be output; and
a time measurement unit configured to measure a time period after interruption is detected by the interruption detection unit until it is detected by the output detection unit that the output is possible, wherein
the playback signal generation unit is configured to output, to the second sound output unit, a playback signal for playing back the music from a playback position advanced forward from a playback position, in which the interruption has been detected by the interruption detection unit, in correspondence to the time period measured by the time measurement unit, and
the output detection unit detects that the sound can be output, when an operation of opening and closing a door of an automobile is performed.

7. The device according to claim 1, wherein
in response to a determination that the time period is longer than the threshold value, the playback signal generation unit sets the playback position to a position of the beginning of the music.

8. The device according to claim 1, wherein
the first sound output unit is at least one of a car audio and a car navigation to be mounted on an automobile, and the second sound output unit is at least one of a headphone and an earphone to be worn on a user.

9. A device comprising:
a playback signal generation unit configured to generate a playback signal for playing back a music and to output the playback signal to a first sound output unit;
an interruption detection unit configured to detect interruption of an output of sound from the first sound output unit during the playback of the music;
an output detection unit configured to detect that sound from a second sound output unit can be output; and
a time measurement unit configured to measure a time period after interruption is detected by the interruption detection unit until it is detected by the output detection unit that the output is possible, wherein
the playback signal generation unit is configured to output, to the second sound output unit, a playback signal for playing back the music from a playback position advanced forward from a playback position, in which the interruption has been detected by the interruption detection unit, in correspondence to the time period measured by the time measurement unit,
the first sound output unit is at least one of a car audio and a car navigation to be mounted on an automobile, and the second sound output unit is at least one of a headphone and an earphone to be worn on a user, and
the interruption detection unit detects that the sound has been interrupted, when an operation of opening and closing a door of the automobile is performed.

10. The device according to claim 8, wherein
the interruption detection unit detects that the sound has been interrupted, when connection to the at least one of the car audio and the car navigation is disconnected.

11. The device according to claim 8, wherein
the output detection unit detects that the sound can be output, when the at least one of the headphone and the earphone is worn on the user.

12. The device according to claim 8, wherein
the output detection unit detects that the sound can be output, when connection to the at least one of the headphone and the earphone is established.

13. The device according to claim 8, wherein
in response to a determination that the time period is longer than the threshold value, the playback signal generation unit sets the playback position to a position of the beginning of the music.

14. A mobile terminal capable of connecting to the first sound output unit and the second sound output unit, comprising:
    the device according to claim 1.

* * * * *